Nov. 1, 1938.   R. E. OLSON   2,135,216
TEMPERATURE-CONTROL SYSTEM FOR PASTEURIZERS
Filed May 8, 1937
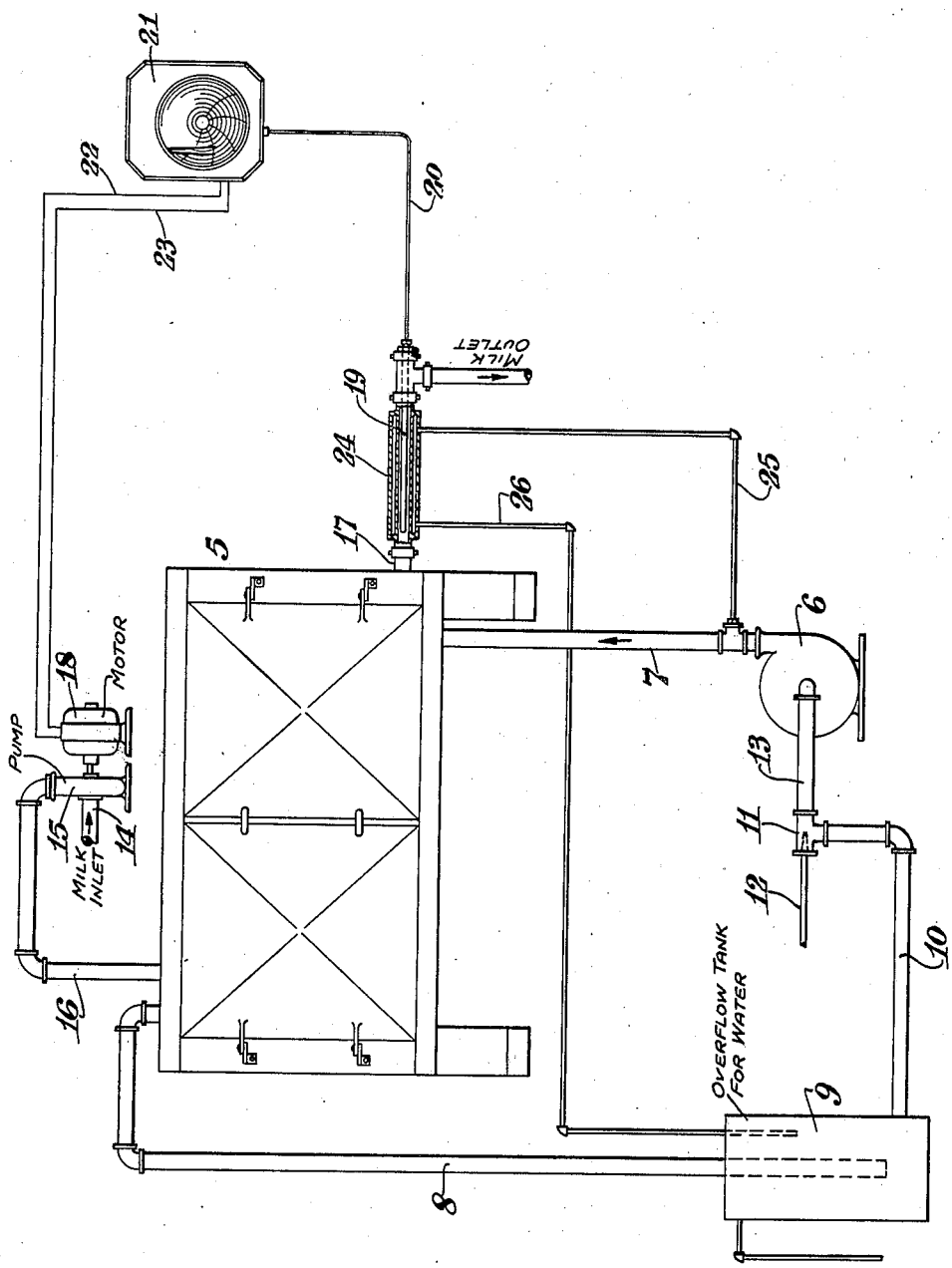
INVENTOR.
RAYMOND E. OLSON
BY
D. Clyde Jones
ATTORNEY.

Patented Nov. 1, 1938

2,135,216

UNITED STATES PATENT OFFICE 2,135,216

TEMPERATURE-CONTROL SYSTEM FOR PASTEURIZERS

Raymond E. Olson, Pittsford, N. Y., assignor to Taylor Instrument Companies, Rochester, N. Y., a corporation of New York Application May 8, 1937, Serial No. 141,487

2 Claims. (Cl. 238—18)

This invention relates to temperature control systems for use in connection with heat exchanging or pasteurizing devices.

In the pasteurizing of liquids such as milk, it is essential that the milk flow to the pasteurizer be stopped when the temperature of the milk at the discharge outlet thereof drops below a predetermined value and that the flow of milk through the pasteurizer again be reestablished when the milk temperature is again restored to the predetermined value.

In certain types of temperature control arrangements in a pasteurizer it has been found desirable to introduce the thermosensitive element of the temperature controller in a position to be exposed to the milk, the temperature of which is to be controlled. However, certain types of pasteurizers or milk heaters, notably those of the plate type, are so constructed that the space between such plates are restricted to a degree that renders it impossible to introduce the thermosensitive element or bulb of a temperature controller within the pasteurizer and it must be placed in the milk discharge pipe. When the thermosensitive element or bulb is introduced into the milk discharge pipe exteriorly of the pasteurizer it will respond to a drop in temperature of the discharged milk and will cause its temperature regulator to stop the milk pump and thereby stop the flow of milk through the pasteurizer, but it will fail to start the milk pump again when the milk in the pasteurizer is restored to the proper temperature. This condition arises since there is no provision for heating the milk in the discharge pipe to a temperature corresponding to that of the milk within the pasteurizer.

In accordance with the present invention, a novel arrangement is provided wherein a temperature regulator will function with a plate type heater or pasteurizer to stop the circulation of the milk through the pasteurizer when the temperature of the milk therein drops lower than a predetermined value and will be effective to reestablish the flow of milk through the pasteurizer when the milk is restored to the predetermined temperature. Other features and advantages of the invention will appear from the detailed description and claims when taken with the drawing in which the single figure thereof is a diagrammatic showing of a pasteurizing system, incorporating the present invention.

In the drawing the numeral 5 generally designates a plate type of milk heater or pasteurizer of the well-known construction in which a series of separable plates provide independent passages through which milk and heated water can pass in heat exchange relation. The specific construction of the pasteurizer is unimportant except that it has no space for introducing a thermosensitive element therein in a position to be exposed to the heated milk. The pasteurizer is connected in a recirculating circuit for hot water or other heating medium which circuit comprises the pump 6, conduit 7, pasteurizer 5, conduit 8, overflow tank 9, conduit 10, injector T 11 into which steam flows through the steam pipe 13 from a suitable steam source (not shown) and under control of temperature regulating mechanism likewise not shown. From the injector T 11, the hot water flows through conduit 13 to the inlet of pump 6 thereby completing the circuit. It will be understood that the pump 7 is driven by suitable means (not shown) to recirculate the water in the circuit just described and through the pasteurizer during the pasteurizing operation.

The milk or other liquid to be pasteurized is pumped through pipe 14 from a storage vat (not shown) by a suitable milk pump 15 and thence through the inlet pipe 16 into the pasteurizer 5 where the milk flows in heat exchange relation with the circulating water until the milk reaches the discharge or milk outlet pipe 17. The milk pump is driven by a suitable electric motor 18, the circuit of which will be hereinafter described.

In accordance with the present invention, a thermosensitive element or bulb 19 is introduced into the milk outlet pipe 17 in a position to be exposed to the milk issuing from the pasteurizer. This bulb communicates with a capillary tube 20 of a regulating device generally designated 21, which may be of the construction disclosed in the Patent No. 2,050,742, granted to Kenneth L. Tate August 11, 1936. This temperature regulating device is effective when the temperature of the milk in the discharge pipe drops below a predetermined pasteurizing value, to open the circuit of the motor 18 which circuit includes the conductors 22 and 23. Thus when this electrical circuit is opened, the motor 18 stops and the milk pump 15 ceases to cause the milk to flow through the pasteurizer.

In the operation of the pasteurizer it is essential that, when the temperature of the milk therein is restored to the proper value, the electrical circuit including the conductors 22 and 23 of the milk pump motor should be closed. However, since the bulb 19 is positioned in the milk discharge outlet exteriorly of the pasteurizer there is no provision for sensing the temperature of the milk inside of the pasteurizer.

In accordance with the present invention, it is proposed to provide a water jacket 24 about that portion of the milk discharge pipe 17 in which the thermosensitive bulb 19 is located. Water heated to the same temperature as that supplied to the pasteurizer is introduced into the water jacket 24 in a by-pass circuit including conduit 25, which is connected to the main water conduit 7, thence through the water jacket 24, and conduit 26 to the overflow tank 9. Thus the water jacket 24 is connected in multiple with the pasteurizer 5 so that the milk in that portion of the discharge pipe within the water jacket 24 is heated to the same temperature as the milk in the pasteurizer. By this arrangement, when the milk in the pasteurizer has reached the proper value, the milk in the discharge pipe 17 will also be at that same value so that the bulb 19 and the filling medium therein will cause the regulator 21 to close the electrical circuit of the milk pump motor 18 again. The motor 18 operates the milk pump 15 to reestablish the flow of milk through the pasteurizer.

I claim:

1. In combination, a heat exchanger having a first passage therethru for a heating medium which is normally maintained at a given temperature and a second passage in heat exchange relation with said first passage for a liquid to be heated, said second passage communicating with a discharge pipe located externally of said heater, a recirculating circuit for said medium including said first passage, means for causing said liquid to flow thru said second passage and said discharge pipe, regulating mechanism for stopping said means when the temperature of said liquid is below a predetermined value and for starting said means when said liquid reaches said predetermined value, said mechanism including a thermosensitive element located in said pipe in a position to be responsive to the temperature of said liquid, and means including a branch of said recirculating circuit for maintaining the liquid in said discharge pipe at approximately the temperature of the liquid in said heat exchanger.

2. In combination, a heat exchanger having a first pasage therethru for a heating medium which is normally maintained at a given temperature and a second passage in heat exchange relation with said first passage for a liquid to be heated, said second passage communicating with a discharge pipe located externally of said heater, a recirculating circuit for said medium including said first passage, means for causing said liquid to flow thru said second passage and said discharge pipe, regulating mechanism for stopping said means when the temperature of said liquid is below a predetermined value and for starting said means when said liquid reaches said predetermined value, said mechanism including a thermosensitive element located in a portion of said discharge pipe in a position to be responsive to the temperature of said liquid, a water jacket in heat transfer relation to said portion of said discharge pipe, and a branch circuit connected in multiple of said recirculating circuit and including said water jacket, whereby the temperature of the liquid in said pipe is substantially equal to that in said second passage.

RAYMOND E. OLSON.